(12) United States Patent
Chen et al.

(10) Patent No.: US 7,783,151 B2
(45) Date of Patent: Aug. 24, 2010

(54) METHOD FOR FABRICATING DISTRIBUTED BRAGG REFLECTOR WAVEGUIDE

(75) Inventors: Chii-Chang Chen, Jhongli (TW); Hua-Kung Chiu, Jhongli (TW)

(73) Assignee: National Central University, Jhongli, Taoyuan County (TW)

( * ) Notice: Subject to any disclaimer, the term of this patent is extended or adjusted under 35 U.S.C. 154(b) by 0 days.

(21) Appl. No.: 12/390,596

(22) Filed: Feb. 23, 2009

(65) Prior Publication Data
US 2010/0104235 A1  Apr. 29, 2010

(30) Foreign Application Priority Data
Oct. 27, 2008 (TW) .............................. 97141198 A

(51) Int. Cl.
| | |
|---|---|
| G02B 6/10 | (2006.01) |
| G02B 6/12 | (2006.01) |
| G02B 6/34 | (2006.01) |
| G02B 6/00 | (2006.01) |
| G02B 6/02 | (2006.01) |
| G02F 1/295 | (2006.01) |
| H01S 5/00 | (2006.01) |
| H01S 3/08 | (2006.01) |
| H01L 21/00 | (2006.01) |
| C03B 37/022 | (2006.01) |
| B05D 5/06 | (2006.01) |

(52) U.S. Cl. ............ 385/132; 385/10; 385/14; 385/37; 385/129; 385/130; 385/131; 385/141; 372/45.01; 372/50.01; 372/50.11; 372/96; 372/102; 438/29; 438/30; 438/31; 438/32; 65/386; 427/163.2; 427/166; 427/167; 427/168; 427/169

(58) Field of Classification Search ............... 385/10, 385/14, 37, 129–132, 141; 372/45.01, 50.1, 372/50.11, 96, 102; 438/29–32; 65/386; 427/163.2, 166–169
See application file for complete search history.

(56) References Cited

U.S. PATENT DOCUMENTS

| | | | | |
|---|---|---|---|---|
| 5,995,531 | A * | 11/1999 | Gaw et al. | 372/96 |
| 7,367,691 | B2 * | 5/2008 | Lin | 362/293 |
| 2002/0135877 | A1 * | 9/2002 | Fan et al. | 359/577 |
| 2003/0032209 | A1 * | 2/2003 | Yeh et al. | 438/22 |
| 2007/0058916 | A1 * | 3/2007 | Lo et al. | 385/131 |

* cited by examiner

*Primary Examiner*—Brian M. Healy
*Assistant Examiner*—Hung Lam
(74) *Attorney, Agent, or Firm*—Thomas, Kayden, Horstemeyer & Risley, LLP

(57) ABSTRACT

A method for fabricating a distributed Bragg reflector waveguide is disclosed, which includes forming a first distributed Bragg reflector on a substrate; forming a sacrificial pattern on the first distributed Bragg reflector; forming a second distributed Bragg reflector on the sacrificial pattern and the first distributed Bragg reflector; and removing the sacrificial pattern. A distributed Bragg reflector waveguide is also disclosed.

5 Claims, 4 Drawing Sheets

METHOD FOR FABRICATING DISTRIBUTED BRAGG REFLECTOR WAVEGUIDE

RELATED APPLICATIONS

This application claims priority to Taiwan Application Serial Number 97141198, filed Oct. 27, 2008, which is herein incorporated by reference.

BACKGROUND

1. Field of Invention

The present invention relates to a waveguide. More particularly, the present invention relates to a distributed Bragg reflector waveguide and fabricating method thereof.

2. Description of Related Art

With continuous progress in network technology, the demand for communication bandwidth has increased continuously. Meanwhile, various transmission media are also developed subsequently, such as microwave communication, satellite communication, etc. Among those transmission media, fiber optic communication plays an increasingly important role.

The waveguide is an important structure for fiber optic communication. The electromagnetic wave can proceed in the waveguide rapidly by the total reflection within the waveguide. However, the electromagnetic wave could not be totally reflected at the corner of the conventional waveguide, especially at corners that are approximately at a right angle. A part of the electromagnetic wave may pass through the sidewall of the waveguide directly at the corner causing wastage of the electromagnetic wave at the corner.

Moreover, plenty of processes, such as a grinding process, a polishing process, or a wafer bonding process are required when the waveguide is utilized in a semiconductor component. The complex fabricating processes thereof would generate extraneous cost and time to use the waveguide to the semiconductor component.

SUMMARY

An embodiment of the invention provides a method for fabricating a distributed Bragg reflector waveguide, which includes forming a first distributed Bragg reflector on a substrate; forming a sacrificial pattern on the first distributed Bragg reflector; forming a second distributed Bragg reflector on the sacrificial pattern and the first distributed Bragg reflector; and removing the sacrificial pattern.

Another embodiment of the invention provides a distributed Bragg reflector waveguide, which includes a substrate having a surface, a distributed Bragg reflector film stack formed on the surface of the substrate, and a channel disposed in the distributed Bragg reflector film stack. The interface contact the channel is continuous.

It is to be understood that both the foregoing general description and the following detailed description are by examples, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention. In the drawings.

DESCRIPTION OF THE PREFERRED EMBODIMENTS

Figure 1:
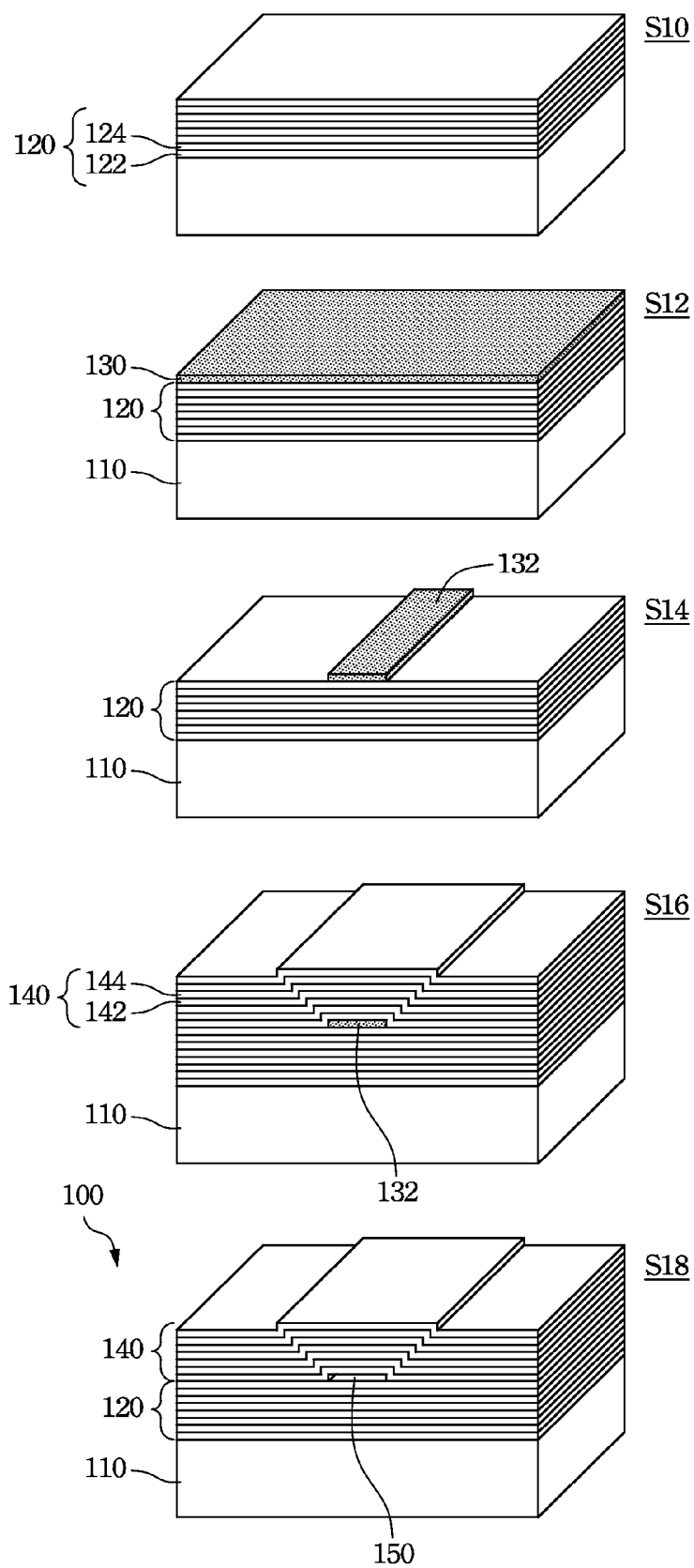
FIG. 1 illustrates a schematic diagram of the fabricating method of an embodiment of the invention.

Reference will now be made in detail to the present preferred embodiments of the invention, examples of which are illustrated in the accompanying drawings. Wherever possible, the same reference numbers are used in the drawings and the description to refer to the same or like parts.

Refer to FIG. 1. FIG. 1 illustrates a schematic diagram of the fabricating method of the first embodiment of the invention. The method for fabricating a distributed Bragg reflector waveguide starts at step S10. In step S10, a substrate 110 is provided, and a first distributed Bragg reflector (DBR) 120 is formed on the substrate 110.

In step S12 a photoresist layer 130 is formed on the first distributed Bragg reflector 120. In step S14, the photoresist layer 130 is exposed and developed to form a sacrificial pattern 132 on the first distributed Bragg reflector 120. In step S16 a second distributed Bragg reflector 140 is formed on the sacrificial pattern 132 and the first distributed Bragg reflector 120, wherein the sacrificial pattern 132 is wrapped by the first distributed Bragg reflector 120 and the second distributed Bragg reflector 140.

Finally, the sacrificial pattern 132 is removed in step S18, and a distributed Bragg reflector waveguide 100 having a channel 150 is formed. The channel 150 is wrapped by the first distributed Bragg reflector 120 and the second distributed Bragg reflector 140.

The first distributed Bragg reflector 120 can be coated on the substrate 110 in step S10. The coating process to form the first distributed Bragg reflector 120 can be a low-pressure chemical vapor deposition (LPCVD), a plasma-enhanced chemical vapor deposition (PECVD), an atomic layer deposition (ALD), a spin on coating, a molecular beam epitaxy (MBE), a sputtering, a metal-organic chemical vapor deposition, a thermal coating, or a E-gun coating.

The material of the substrate 110 can be silicon, germanium, semiconductor III-V, semiconductor II-VI, silicon dioxide ($SiO_2$), alumina ($Al_2O_3$), calcium carbonate ($CaCO_3$), or plastic.

Plural pairs of dielectric material layers 122 and 124 are coated and stacked on the substrate 110 to form the first distributed Bragg reflector 120. The first distributed Bragg reflector 120 is a film stack of plural pairs of dielectric material layers 122 and 124, and the first distributed Bragg reflector 120 has a high reflectivity. The refractive index of two dielectric material layers 122 and 124 in pair is different form each other. The higher difference between the refractive index of the dielectric material layers 122 and 124 is, the less pairs of the dielectric material layers 122 and 124 is required.

The material of the dielectric material layer 122 and 124 can be silicon, silicon dioxide ($SiO_2$), silicon nitride ($Si_3N_4$), titanium dioxide ($TiO_2$), gallium arsenide (GaAs), AlGaAs, AlGaInP, or AlInP.

The photoresist layer 130 is exposed and developed in step S14 to define the sacrificial pattern 132. The shape of the sacrificial pattern 132 is defined according to the shape of the distributed Bragg reflector waveguide 100. The shape of the sacrificial pattern 132 in this embodiment is a rectangle.

The second distributed Bragg reflector 140 can be coated on the sacrificial pattern 132 and the first distributed Bragg reflector 120. The second distributed Bragg reflector 140 is a film stack of plural pairs of dielectric material layers 142 and 144, and the second distributed Bragg reflector 140 has a high reflectivity. The second distributed Bragg reflector 140 includes plural pairs of dielectric material layers 142 and 144. The refractive index of two dielectric material layers 142 and 144 in pair is different from each other. The sacrificial pattern 132 is wrapped by the first distributed Bragg reflector 120 and the second distributed Bragg reflector 140.

The sacrificial pattern 132 (not shown) is removed in step S18. The substrate 110 and the structure thereon can be soaked in a photoresist stripper to remove the sacrificial pattern 132, and the channel 150 is formed between the first distributed Bragg reflector 120 and the second distributed Bragg reflector 140.

The photoresist stripper can be an organic solution or an inorganic solution. The structure of the sacrificial pattern 132 would be destroyed in the organic solution, and the sacrificial pattern 132 would be solved in the organic solution, such as acetone, dimethyl sulfuroxide (DMSO), methylethyl amide (MEA), phenol base solution, or other organiv solution. In step S18 the sacrificial pattern 132 can also be soaked in the inorganic solution mixed by sulfuric acid and hydrogen peroxide to remove the sacrificial pattern 132.

Figure 2:
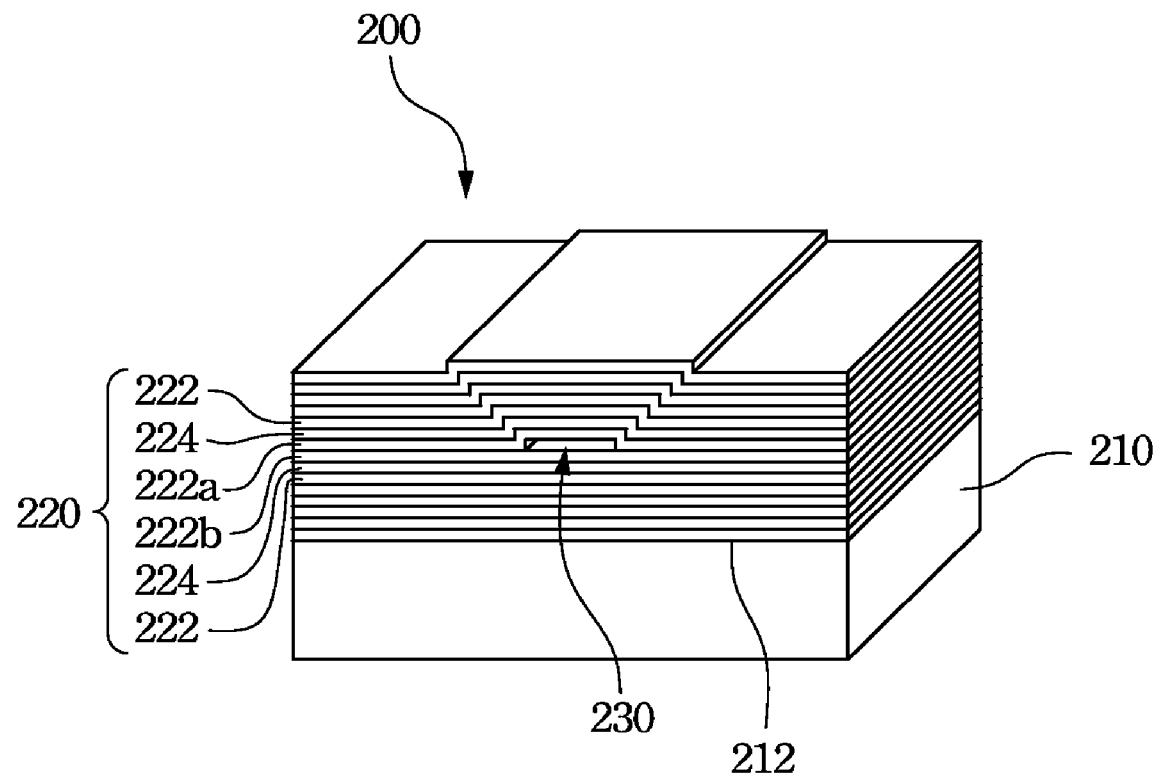
FIG. 2 illustrates a side view diagram of an embodiment of the distributed Bragg reflector waveguide of the invention.

Refer to FIG. 2. FIG. 2 illustrates a side view diagram of the first embodiment of the distributed Bragg reflector waveguide of the invention. The distributed Bragg reflector 200 includes a substrate 210, a distributed Bragg reflector film stack 220, and a channel 230. The substrate 210 has a surface 212. The surface 212 is a plane surface in this embodiment. The distributed Bragg reflector film stack 220 is formed on the surface 212 of the substrate 210. The distributed Bragg reflector film stack 220 includes plural pairs of dielectric material layers 222 and 224. The channel 230 is disposed in the distributed Bragg reflector film stack 210.

The distributed Bragg reflector film stack 220 includes plural pairs of dielectric material layers 222 and 224, and the refractive index of two dielectric material layers 222 and 224 in pair is different from each other. The material of the dielectric material layer 222 and 224 can be silicon, silicon dioxide ($SiO_2$), silicon nitride ($Si_3N_4$), titanium dioxide ($TiO_2$), gallium arsenide (GaAs), AlGaAs, AlGaInP, or AlInP.

The higher difference between the refractive index of the dielectric material layers 222 and 224 is, the less pairs of the dielectric material layers 222 and 224 is required. The reflectivity surround the channel 230 can be highly improved by the pairs of dielectric material layers 222 and 224, and the wastage of the electromagnetic wave at the corner of the distributed Bragg reflector waveguide 200 can be reduced.

The channel 230 is wrapped by two adjacent dielectric material layers 222a and 222b, and an interface between the dielectric material layers 222a, 222b, which contact the channel 230 is continuous. Namely, the interface between the dielectric material layers 222a and 222b would not be cut when the channel 230 is formed. The adjacent dielectric material layers 222a and 222b have the same refractive index. The cross sectional shape of the channel 220 can be a rectangle. The distributed Bragg reflector waveguide 200 could further include a fluid filled in the channel 230.

Figure 3:
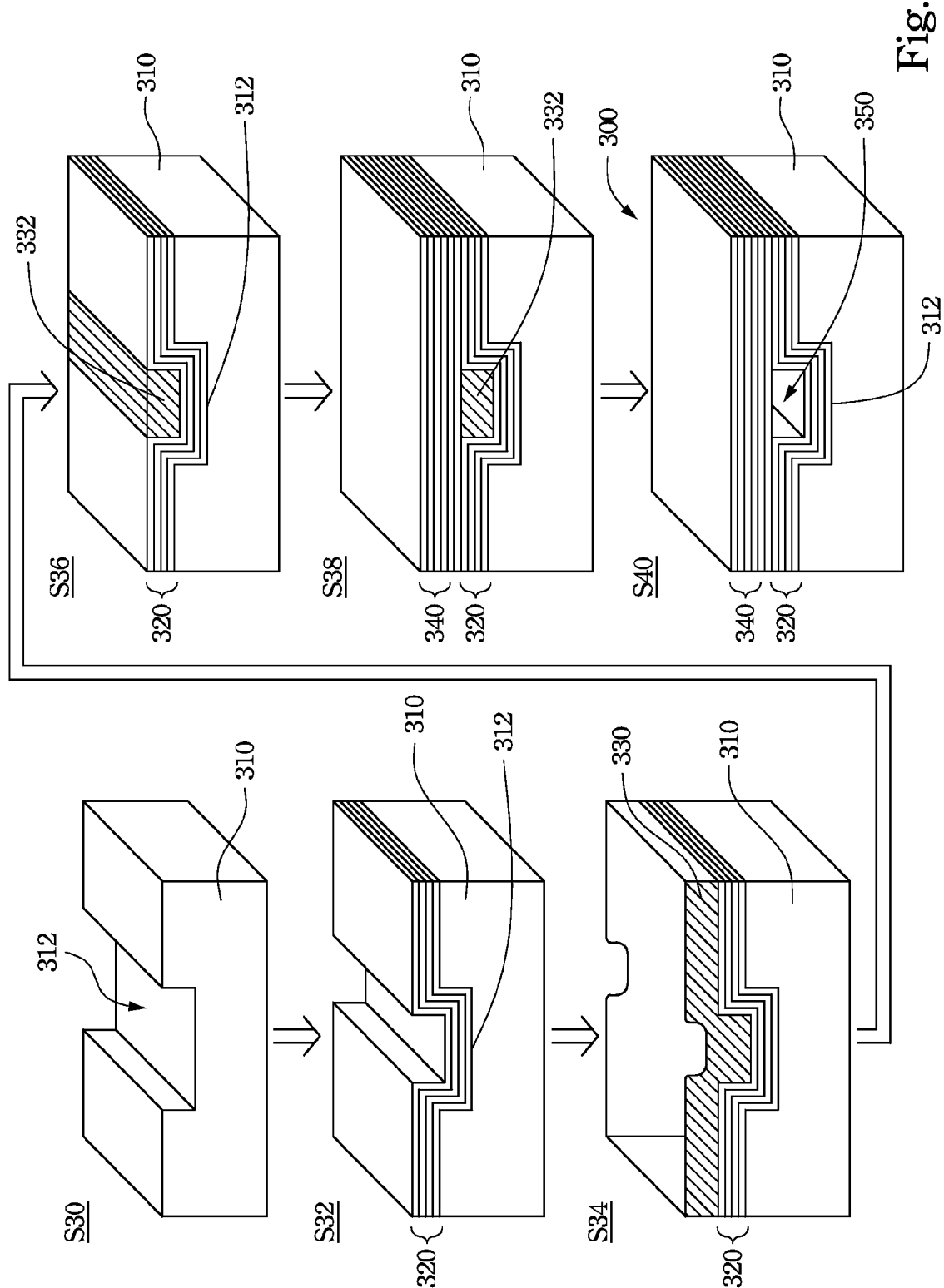
FIG. 3 illustrates a schematic diagram of the fabricating method of another embodiment of the invention.

Refer to FIG. 3. FIG. 3 illustrates a schematic diagram of another embodiment of the fabricating method of the invention. A groove 312 is formed on the substrate 310 in step S30. The first distributed Bragg reflector 320 is formed on the groove 312 and the substrate 310.

Step S34 forms the photoresist layer 330 on the first distributed Bragg reflector 320. Then, step S36 removes the unwanted part of the photoresist layer to define the sacrificial pattern 332 on the first distributed Bragg reflector 320, wherein the sacrificial pattern 332 is formed in the groove 312.

Step S38 forms the second distributed Bragg reflector 340 on the sacrificial pattern 332 and the first distributed Bragg reflector 320. The sacrificial pattern 332 is wrapped by the first distributed Bragg reflector 320 and the second distributed Bragg reflector 340.

Finally, the sacrificial pattern 332 is removed in step S40 to form the channel 350 in the distributed Bragg reflector waveguide 300. The channel 350 is formed in the groove 312, and the channel 350 is wrapped by the first distributed Bragg reflector 320 and the second distributed Bragg reflector 340.

Figure 4:
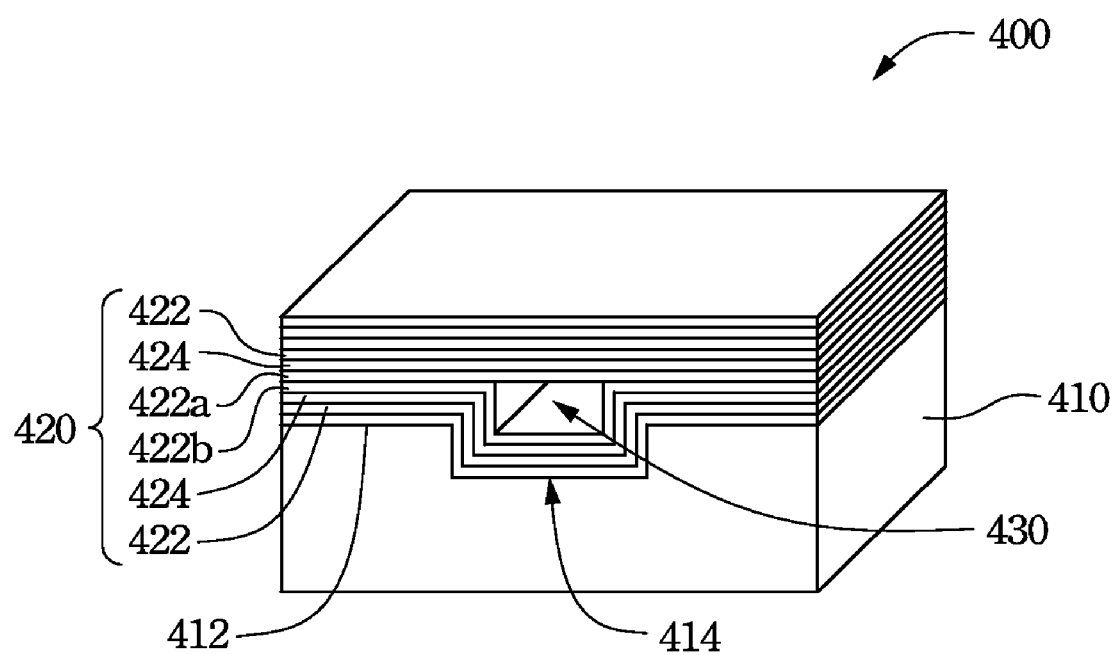
FIG. 4 illustrates a side view diagram of another embodiment of the distributed Bragg reflector waveguide of the invention.

Refer to FIG. 4. FIG. 4 illustrates a side view diagram of another embodiment of the distributed Bragg reflector waveguide of the invention. The distributed Bragg reflector waveguide 400 includes a substrate 410, a distributed Bragg reflector film stack 420, and a channel 430. The distributed Bragg reflector waveguide 400 has the groove 414 formed on the surface 412 of the substrate 410. The distributed Bragg reflector film stack 420 is formed on the groove 414 and the surface 412 of the substrate 410.

The distributed Bragg reflector film stack 420 includes plural pairs of dielectric material layers 422, 424, and the refractive index of two dielectric material layers 422, 424 in pair is different from each other. The higher difference between the refractive index of the dielectric material layers 422, 424 is, the less pairs of the dielectric material layers 422, 424 is required.

The channel 430 is disposed in the distributed Bragg reflector film stack 420, and is disposed in the groove 414. The channel 430 is wrapped by two adjacent dielectric material layers 422a, 422b, and the interface between the dielectric material layers 422a, 424b, which contact the channel 430 is continuous. Namely, the interface between the dielectric material layers 422a, 422b would not be cut when the channel 430 is formed. The adjacent dielectric material layers 422a, 422b have the same refractive index. The cross sectional shape of the channel 420 can be a rectangle. The distributed Bragg reflector waveguide 400 could further include a fluid filled in the channel 430.

The distributed Bragg reflector waveguide in the invention can be fabricated by the coating the distributed Bragg reflector film stack on the substrate. The fabrication of the distributed Bragg reflector waveguide can be integrated with other semiconductor components on the substrate.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A method for fabricating a distributed Bragg reflector waveguide comprising:

forming a first distributed Bragg reflector on a substrate;

forming a sacrificial pattern on the first distributed Bragg reflector;

forming a second distributed Bragg reflector on the sacrificial pattern and the first distributed Bragg reflector; and soaking the sacrificial pattern in a photoresist stripper after forming the second Bragg reflector for removing the sacrificial pattern.

2. The method for fabricating a distributed Bragg reflector waveguide of claim 1, wherein forming the sacrificial pattern comprises forming a photoresist layer on the first distributed Bragg reflector, and the photoresist layer is exposed and developed to form the sacrificial pattern.

3. The method for fabricating a distributed Bragg reflector waveguide of claim 1, wherein forming the first distributed Bragg reflector comprises coating a plurality pairs of dielectric material layers, wherein the refractive index of two dielectric material layers in pair is different from each other.

4. The method for fabricating a distributed Bragg reflector waveguide of claim 1, wherein forming the second distributed Bragg reflector comprises coating a plurality pairs of dielectric material layers, wherein the refractive index of two dielectric material layers in pair is different from each other.

5. The method for fabricating a distributed Bragg reflector waveguide of claim 1, further comprising forming a groove on the substrate, wherein a part of the first distributed Bragg reflector and the sacrificial pattern are formed in the groove.

* * * * *